Sept. 9, 1969 J. J. VANDEMORE ETAL 3,466,472

TIMING CIRCUIT METHOD AND APPARATUS

Filed April 16, 1965 2 Sheets-Sheet 1

INVENTORS.
DONALD E. HENRY &
JAMES J. VANDEMORE
BY
Tilberry & Body
ATTORNEYS

TIMING CIRCUIT METHOD AND APPARATUS

Filed April 16, 1965 2 Sheets-Sheet 2

INVENTORS.
DONALD E. HENRY &
JAMES J. VANDEMORE
BY
Tilberry & Body
ATTORNEYS 3,466,472

TIMING CIRCUIT METHOD AND APPARATUS

James J. Vandemore, Geneseo, Ill., and Donald E. Henry, Davenport, Iowa, assignors to E. W. Bliss Company, Canton, Ohio, a corporation of Delaware Filed Apr. 16, 1965, Ser. No. 448,623
Int. Cl. H03k *17/28*
U.S. Cl. 307—293 10 Claims

ABSTRACT OF THE DISCLOSURE

There is provided a relaxation oscillator timing circuit including an electronic control device having an input circuit, a reverse biasing circuit for applying reverse bias voltage to the device, an output circuit, and a timing capacitor connected across the input circuit for storing a voltage. The control device will be forward biased when the value of the stored voltage across the capacitor attains a level equal to a characteristic voltage of the control device. The reverse biasing circuit provides a cyclically varying reverse bias voltage of a given polarity from a source of voltage, so that the time at which the control device fires or "avalanches" is dependent on the frequency of the cyclically varying voltage.

This invention pertains to the art of electronic timing circuits and, more particularly, to a method of operating a timing circuit and an improved timing circuit having a constant timed interval during repeated timing cycles.

The invention is particularly applicable to a unijunction transistor relaxation oscillator timing circuit and will be described with particular reference thereto; although it will be appreciated that the invention has broader applications and may, for example, be used with a gas filled thyratron vacuum tube, or a neon tube.

Electronic timing circuits are extensively used by industry for accurately controlling the operating time of a load device during each work cycle. Such a timing circuit, for example, may be used in a bottling plant for accurately controlling the time of operation of a bottle filling mechanism to assure that each bottle to be filled receives only a predetermined volume of fluid during each work cycle of the filling mechanisms. Another use of an electronic timing circuit is for the purpose of timing the operation of a stitching machine in a garment factory for assuring that the stitching machine operates for only a predetermined interval of time during each work cycle so that, for example, only a fixed number of stitches are made to a fabric or the like. The foregoing are but two of a multiple of uses of an electromagnetic circuit, others being well known to those skilled in the art.

An electronic timing circuit known heretofore takes the form of a unijunction transistor relaxation oscillator circuit, such as that illustrated in Figure 13.18 in General Electric's Transistor Manual, Seventh Edition. That circuit includes a unijunction transistor having an input circuit, a reverse biasing circuit connected to a source of positive steady state voltage, and an output circuit. A unijunction transistor has the characteristic that it will be reverse biased until a predetermined voltage, known as the peak point voltage, is applied to the input circuit of the transistor. The peak point voltage is proportional to the magnitude of the reverse biasing voltage. A timing capacitor is connected across the input circuit of the transistor, and to a voltage source through a capacitor charging circuit for exponentially charging the capacitor toward the level of the peak point voltage at a predetermined rate during each cycle of operation of the timing circuit. When the voltage on the capacitor reaches the peak point voltage, the transistor will become forward biased and the capacitor will discharge through a discharge circuit including the input to output circuit of the transistor. The time required during each cycle of operation to forward bias the transistor may be called the timed interval.

It is important when such a timing circuit is utilized for timing industrial processes that the timed interval be constant during each timing cycle of operation so that, for example, in a bottling plant only a predetermined volume of fluid, no more and no less, is dispensed into a bottle to be filled during each work cycle of a bottling filling mechanism. Accordingly, it is important that the time required to charge the timing capacitor to the peak point voltage of the unijunction transistor be the same for each timing cycle of operation to assure a high degree of repeat accuracy.

The timed interval during each cycle of operation of such a unijunction transistor relaxation oscillator circuit is, to a large extent, dependent on the values of the circuit components, as well as the magnitude of the direct current voltage supply source. Accordingly, the timed interval will vary as the values of the circuit components vary with component tolerance and temperature, and as the magnitude of the supply voltage varies. Timing accuracy can be increased by using components having minimum tolerances and exhibiting minimum variations in values with temperature changes, as well as by using a voltage regulator circuit for stabilizing the value of the direct current supply voltage. All of these expediences add considerably to the cost of a timing circuit, and for many applications are economically impractical. It is also known that the timing accuracy of such a circuit can be improved by driving the timing circuit with a unijunction oscillator circuit, such as that illustrated in Figure 13.32 of the General Electric Transistor Manual, Seventh Edition, so that the timing accuracy of the timing circuit is less dependent on variations in component values resulting from tolerance and temperature variations, or on variations in the magnitude of the supply voltage. However, the timing accuracy of such a driven timing circuit is dependent on the component variations and supply voltage variations of the oscillator driving circuit.

The present invention is directed toward an improved timing circuit and method of operating a timing circuit, whereby the timed interval of a relaxation oscillator timing circuit remains constant as a function of line frequency of an alternating current supply source, and which apparatus and method overcomes the noted disadvantages, and others, of previous timing circuits.

The present invention contemplates a relaxation oscillator timing circuit including: an electronic control device having an input circuit; a reverse biasing circuit for applying reverse bias voltage to the device; an output circuit; and a timing capacitor connected across the input circuit for storing voltage. The device will be forward biased when the value of the stored voltage attains a level equal to a characteristic voltage which is a function of the reverse bias voltage.

In accordance with the present invention, each timing cycle of operation is commenced by charging the capacitor with voltage so that the value of the voltage stored by the capacitor increases at a predetermined rate; and, during each timing cycle a cyclically varying reverse bias voltage of a given polarity and of a given frequency, which is one or a multiple of line frequency, is applied to the reverse bias circuit. Thus, the characteristic voltage which would exist with full filtering is instead repetitively lowered at twice line frequency so that the stored voltage attains a level equal to the characteristic voltage slightly sooner than it would if full filtering were used, and the timed period is thus locked to the given frequency.

In accordance with a further a spect of the present invention, a pulsating capacitor charging voltage of the same given frequency and given polarity as that of the varying reverse bias voltage is applied to the capacitor, so that the capacitor will be pulse charged at a rate equal to the given frequency and the voltage across the capacitor will lead, in phase, the varying voltage applied to the reverse biasing circuit. By pulse charging the timing capacitor, the stored voltage will, for each pulse, increase at a greater rate than if linearly charged, providing greater accuracy as to the point in time during each cycle of operation when the stored voltage attains a level equal to the characteristic voltage.

In accordance with a preferred aspect of the invention, the cyclically varying reverse bias voltage is obtained by full wave rectifying line frequency voltage, and then insufficiently filtering the rectified voltage so as to leave a ripple voltage, having a frequency twice that of line frequency superimposed on a steady state direct current voltage. The combined ripple voltage and direct current voltage are applied to the reverse biasing circuit.

The principal object of the present invention is the provision of a method of operation of a timing circuit and an improved timing circuit for timing constant timed intervals during each timing cycle of operation which overcome the noted difficulties, and others, encountered by previous timing circuits.

A primary object of the present invention is to provide an improved timing circuit for obtaining constant timed intervals during repeat timing cycles without requiring the use of a voltage regulator circuit.

Another object of the present invention is to provide an improved timing circuit for obtaining constant timed intervals during repeat timing cycles without requiring an oscillator circuit to drive the timing circuit.

A further object of the present invention is to provide a timing circuit wherein the timing accuracy of each timed interval is not substantially affected by variations in the values of the circuit components.

Another object of the present invention is to provide a method of operating a timing circuit and an improved timing circuit in which the timing accuracy of each timed interval is a function of the line frequency of an alternating current voltage supply source.

The invention may take physical form in certain parts and arrangement of parts, a preferred embodiment of which will be described in detail in the specification and illustrated in the accompanying drawings which is a part hereof, and wherein.

Figure 1:
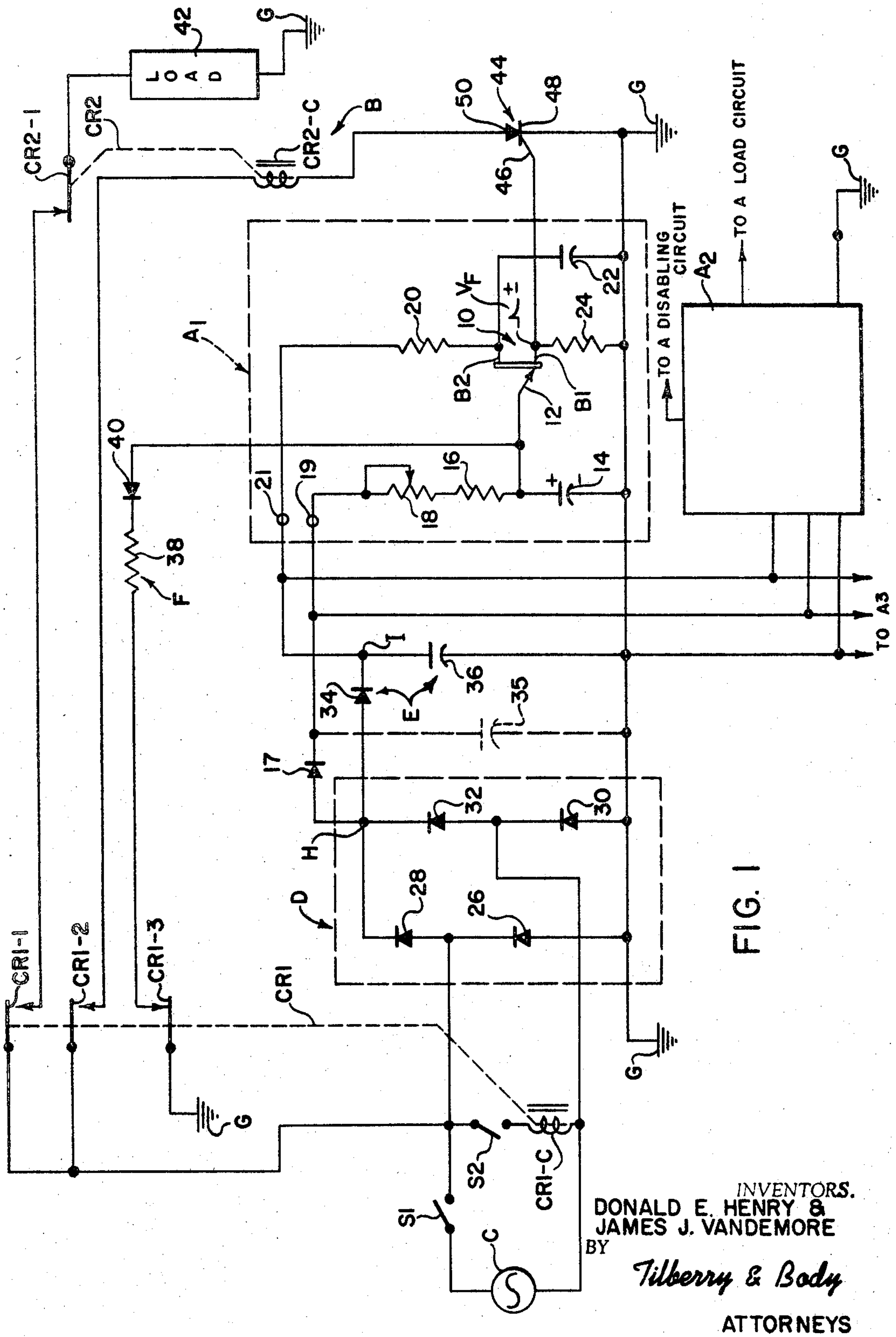
FIGURE 1 is a schematic circuit diagram illustrating a preferred embodiment of the invention.

Referring now to the drawings wherein the showings are for the purposes of illustrating a preferred embodiment of the invention only and not for the purposes of limiting same, FIGURE 1 illustrates a timing circuit comprised generally of a plurality of unijunction transistor relaxation oscillator circuits $A_1$, $A_2$, etc.; a load circuit B; an alternating current voltage supply source C; a full wave rectifier circuit D; an isolation-filter circuit E; and, a unijunction transistor disabling circuit F.

The relaxation oscillator circuits $A_1$, $A_2$, etc., are substantially identical and only oscillator circuit $A_1$ is described in detail, it being understood that the following description applies equally to the remaining oscillator circuits. Relaxation oscillator circuit $A_1$ includes a unijunction transistor 10 having an emitter 12, a first base B1 and a second base B2. The input circuit of transistor 10 is taken between ground G and the emitter 12, and is connected across a timing capacitor 14. Capacitor 14 is connected in series with a capacitor charging circuit including a fixed timing resistor 16 and an adjustable timing resistor 18 connected together in series between ground G and a terminal point 19. Base B2 of transistor 10 is connected to a terminal point 21 through a reverse bias circuit including resistor 20, and is also connected to ground G through a transient suppressor capacitor 22. Base B1 is connected to ground G through a load resistor 24.

The unijunction transistor oscillator circuit described thus far, with the exception of transient suppressor capacitor 22, and with terminal points 19 and 21 connected to the positive side of a regulated direct current voltage supply source, is similar to that as illustrated in Figure 13.18 of General Electric's Transistor Manual, Seventh Edition. The operation of such a circuit is well known to those skilled in the art, and during each cycle of timing operation, capacitor 14 will charge exponentially, as illustrated by waveform $V_{14}$ in FIGURE 2, toward the supply voltage at a rate according to a RC time constant determined by the values of resistors 16, 18 and capacitor 14. The positive reverse biasing voltage on base B2 of transistor 10 will be steady state, as illustrated by the waveform $V_{B2}$ in FIGURE 2. As the voltage stored by the timing capacitor, with reference to ground G, increases in magnitude, the voltage appearing on emitter 12 of transistor 10, with reference to ground G, will also increase. When the magnitude of the voltage stored by the capacitor 14 attains a level equal to the peak point voltage $V_P$ of unijunction transistor 10, the emitter 12 will become forward biased and the dynamic resistance between emitter 12 and base B1 will drop to an exceedingly small value, and the capacitor 14 will discharge through a discharge circuit including emitter 12 and base B1 of transistor 10, and through the load resistor 24 to ground G. The time required for the voltage stored by capacitor 14 to attain a level equal to the peak point voltage $V_P$ is the timed interval (see FIGURE 2) of the relaxation oscillator circuit.

Figure 2:
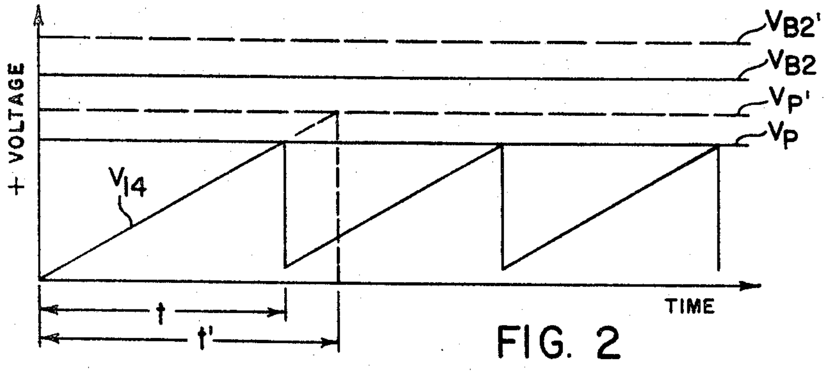
FIGURE 2 shows graphical waveforms of voltage versus time illustrating the operation of a conventional unijunction transistor relaxation oscillator circuit; and, FIGURES 3A, B, and C are graphical waveforms of voltage versus time illustrating the operation of the preferred embodiment of the present invention.

As will be appreciated with reference to the waveforms in FIGURE 2, the peak point voltage $V_P$ of transistor 10 is a fraction of the reverse bias voltage $V_{B2}$ applied to base B2 with respect to ground G. This relation is expressed as:

$$V_P = NV_{B2}$$

where N is the intrinsic standoff ratio of unijunction transistor 10.

With reference to the waveforms of FIGURE 2, it will be noted that if the reverse bias voltage applied to base B2 of transistor 10 increases from the value indicated by the waveform for bias voltage $V_{B2}$ to that indicated by a waveform for a greater bias voltage $V_{B2}'$, the peak point voltage $V_P$ of transistor 10 will increase to a voltage $V_P'$. Thus, as illustrated in FIGURE 2, an increase in the value of the reverse bias voltage $V_{B2}$ to $V_{B2}'$ will result in an increase of the timed interval $t$ to $t'$. Accordingly, a timing circuit as described thus far, is dependent for its timing accuracy on the stability of the value of the direct current voltage supply source connected to terminal points 19 and 21, requiring the provision of a voltage regulator circuit to maintain the reverse bias voltage $V_{B2}$ and, hence, the peak point voltage $V_P$ constant during timing cycles of operation to obtain meaningful repeat timing accuracy with repeat timing cycles.

In accordance with the present invention, the relaxation oscillator circuits $A_1$, $A_2$, etc., are connected across an alternating current voltage source C through isolation-filter circuit E and full wave rectifier circuit D so that, as will be described in greater detail in the following description of operation, the reverse bias voltage applied to base B2 of transistor 10 will have superimposed thereon an alternating ripple voltage of a frequency twice that of the source C, and that the timing capacitor 14 will be pulse or step charged at a rate equal to twice the frequency of the source C, whereby timing accuracy will be a function of the frequency of source C. Preferably, the alternating current voltage supply source C takes the form of line voltage obtained from a local power utility exhibiting a frequency of 60 cycles per second at a voltage of substantially 120 volts. The frequency stability of such a source is relatively high, and, for example, most power utilities state that the frequency stability from cycle to cycle taken over a twenty-four hour period is in the order of 1/10 of 1%.

Figure 3A:
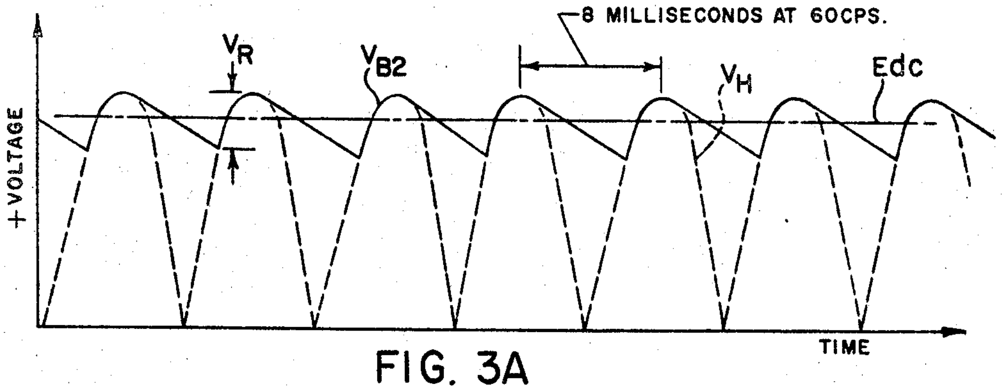

The full wave rectifier circuit D includes four rectifying diodes 26, 28, 30, and 32, poled as illustrated in FIGURE 1, with diodes 26 and 28 being connected in series between ground G and terminal point H, and with diodes 30 and 32 similarly connected together in series between ground G and terminal point H. The input circuit of the full wave rectifier circuit D is taken across the junction between diodes 26 and 28 and the junction between diodes 30 and 32, and is connected across the voltage source C through a normally open, manual operable switch S1. The output circuit of rectifier circuit D is taken between ground G and terminal point H. The waveform of the full wave rectified voltage $V_H$, taken across the output circuit of rectifying circuit D, is illustrated by dotted lines in FIGURE 3A.

The timing capacitor 14 in relaxation oscillator circuit $A_1$, is connected between ground G and terminal point H of rectifier circuit D, through timing resistors 16 and 18, and an isolation diode 17, poled as shown in FIGURE 1. As will be described in greater detail in the following description of operation, capacitor 14 will be pulse or step charged by the full wave rectified voltage $V_H$ and at a frequency equal to twice that of the frequency of source C.

The isolation-filter circuit E includes a diode 34, poled as illustrated in FIGURE 1, and a filter capacitor 36 connected across the output circuit of rectifier circuit D between ground G and a terminal point I. Terminal point I is in turn connected to base B2 of unijunction transistor 10, through bias resistor 20. The filter capacitor 36, in accordance with the invention, is of insufficient capacity to fully filter the full wave rectified voltage $V_H$ and a pulsating positive direct current voltage $V_{B2}$ results, having a waveform as illustrated by solid lines in FIGURE 3A, from which it is seen that the voltage $V_{B2}$ is, in effect, comprised of a steady state positive direct current voltage E*dc* (dotted lines in FIGURE 3A) having superimposed thereon a ripple voltage $V_R$ exhibiting a frequency equal to twice that of source C. The ripple voltage $V_R$ is sufficient to exert a stabilizing effect on the timed period, and is preferably at least 5% that of the value of the supply source C.

The unijunction transistor disabling circuit F, which serves prior to commencement of a timing cycle of operation of the timing circuit to disable relaxation oscillator circuit $A_1$, includes a resistor 38 connected in series with a diode 40, poled as illustrated in FIGURE 1, which together connect emitter 12 of unijunction transistor 10 to ground G, through normally closed relay contacts CR1–3 of a relay CR1. Relay CR1 also includes a relay coil CR1–C connected across voltage source C through a normally open switch S2, which may be controlled manually or remotely by suitable electrical means. Relay CR1 also includes normally open relay contacts CR1–1 and CR1–2, the significance of which will be described hereinafter.

The load circuit for each relaxation oscillator $A_1$, $A_2$, etc., takes the form, for example, of load circuit B for oscillator $A_1$. Load circuit B includes generally: an electrically energizable load mechanism 42; a relay CR2; and, an electronic switching device taking the form of a silicon controlled rectifier 44. The gate 46 of silicon controlled rectifier 44 is connected to base B1 of unijunction transistor 10, and the cathode 48 of rectifier 44 is connected to ground G.

Relay CR2 includes a relay coil CR2–C and associated normally closed relay contacts CR2–1. Relay coil CR2–C is connected across the voltage source C through normally open relay contacts CR1–2, the anode 50 to cathode 48 circuit of silicon controlled rectifier 44, and from ground G through rectifier diode 30. Similarly, load mechanism 42 is connected across voltage source C through normally open relay contacts CR1–1, normally closed relay contacts CR2–1, and from ground G through rectifier diode 30.

OPERATION

Upon closure of switch S1, and with switch S2 maintained opened as illustrated in FIGURE 1, alternating voltage at line frequency, which preferably is 60 cycles per second, is applied to the input circuit of rectifying circuit D, where the voltage is fully rectified to obtain at the output circuit of rectifier circuit D, a full wave rectified voltage $V_H$ (see FIGURE 3A) of positive polarity. Since relay coil CR1–C will not be energized when switch S2 is open, normally closed contacts CR1–3 remain closed, as illustrated in FIGURE 1, whereby the emitter 12 of unijunction transistor 10 is connected to ground G through diode 40 and resistor 38. Accordingly, the timing capacitor 14 is by-passed by disabling circuit F and will not charge toward the value of source C.

A timing cycle of operation of oscillator circuit $A_1$ commences with closure of switch S2 with switch S1 previously closed. Upon closure of switch S2 alternating current of sufficient magnitude will flow through relay coil CR1–C to energize the coil, whereupon normally open relay contacts CR1–1 and CR1–2 will close and normally closed relay contacts CR1–3 will open. With relay contacts CR1–1 closed, load mechanism 42 will be energized by alternating current flow therethrough from source C through now closed switch S1, now closed contacts CR1–1, normally closed relay contacts CR2–1, through load mechanism 42, and from ground G through diode 30. Also, closure of relay contacts CR1–2 connects relay coil CR2–C with source D; however, coil CR2–C will not be energized until a positive voltage trigger pulse of sufficient magnitude is applied to gate 46 of silicon controlled rectifier 44 to forward bias the rectifier and permit current to flow therethrough. Upon the opening of normally closed relay contacts CR1–3 the unijunction transistor disabling circuit F will be deactivated since the circuit connection of emitter 12 of unijunction transistor 10 to ground G through diode 40 and resistor 38 will be broken.

With disabling circuit F deactivated, timing capacitor 14 of oscillator $A_1$ will be pulse charged by the full wave rectified voltage $V_H$ at a rate equal to twice the frequency of source C, as well as in accordance with the RC time constant determined by the values of timing resistors 16 and 18, and of capacitor 14. The waveform of the actual voltage $V_C$ stored by capacitor 14 as a function of time is illustrated by solid lines in FIGURE 3B. The average voltage $V_C$ (ave.) stored as a function of time is illustrated by dotted lines in FIGURE 3B.

The voltage applied across filter capacitor 36 between ground G and terminal point I is partially filtered by the capacitor and is applied through bias resistor 20 to base B2 of unijunction transistor 10. This partially filtered voltage as reduced by bias resistor 20 serves as a pulsasting positive direct current reverse bias voltage $V_{B2}$ and has a waveform, as illustrated by the solid lines in FIGURE 3A, from which it will be observed that the capacitor 36 has not sufficiently filtered the pulsating full wave rectified voltage $V_H$ to obtain a steady state positive direct voltage E*dc*, but has instead, in effect, superimposed on the steady state voltage E*dc* a ripple voltage $V_R$ of a frequency equal to twice that of source C.

The peak point voltage $V_P$ of unijunction transistor 10 varies in accordance with the reverse bias potential $V_{B2}$ on base B2 of transistor 10, and may be represented as follows:

$$V_P = NV_{B2}$$

but, $$V_{B2} = Edc \pm \frac{V_R}{2}$$

therefore, $$V_P = N\left[Edc \pm \frac{V_R}{2}\right]$$

Figure 3B:
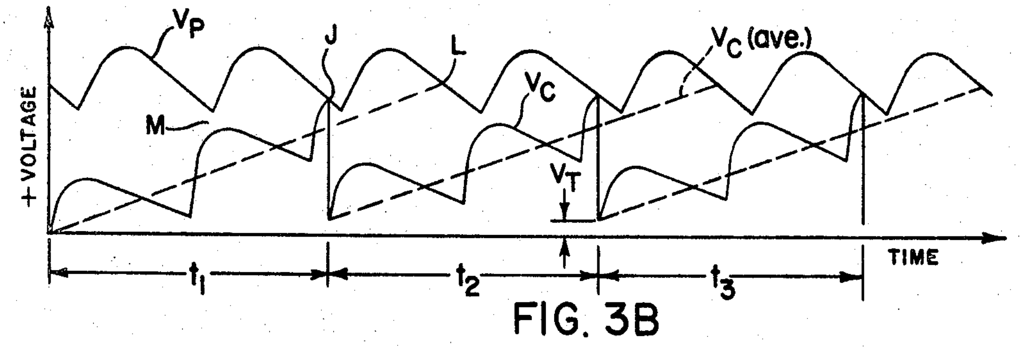
Figure 3C:
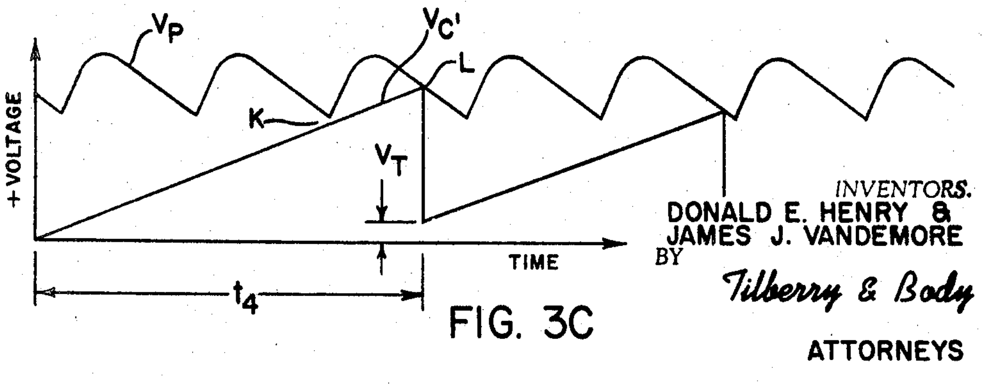

The waveform of peak point voltage $V_P$ is illustrated by solid lines in FIGURES 3B and 3C.

After commencement of a timing operation by closure of switch S2, the stored voltage $V_C$ (see FIGURE 3B) will reach the level of the peak point voltage $V_P$ at a time corresponding with firing point J. When voltage $V_C$ across the capacitor 14 and, hence, that applied to emitter 12 of the unijunction transistor 10 with respect to ground G, is equal to the peak point voltage $V_P$, the emitter 12 will become forward biased and the dynamic resistance between the emitter 12 and base B1 of transistor 10 will drop to an exceedingly small value, and the transistor will become conductive. The capacitor 14 will then discharge through a discharge circuit from the positive side of the capacitor, as illustrated in FIGURE 1, through the emitter 12 to base B1 of transistor 10, the load resistor 24 and back to the negative side of capacitor 14. The RC time constant of the capacitor discharge circuit is relatively short and a positive voltage pulse $V_F$, having a waveform as illustrated in FIGURE 1, will be developed across resistor 24 with respect to ground G. The voltage pulse $V_F$ is applied to gate 46 of silicon controlled rectifier 44 and is of sufficient magnitude to forward bias rectifier 44. With rectifier 44 forward biased and with relay coil CR1–C previously energized, current will flow through the anode 50 to cathode 48 circuit of rectifier 44, whereby relay coil CR2–C will become energized causing its associated narmally closed contacts CR2–1 to open. When normally closed relay contacts CR2–1 open, current will no longer flow from source C through load 42.

After relay CR2–C has been energized, and current is removed from load mechanism 42, an operator or an electronically responsive device, as desired, will respond to this condition and open switch S2 to return relay contacts CR1–1, CR1–2 and CR1–3 to their normal positions, as illustrated in FIGURE 1. With relay contacts CR1–2 returned to their normally open position, current will no longer flow through relay coil CR2–C which will then become de-energized and its associated relay contacts CR2–1 will return to their normally closed position, as illustrated in FIGURE 1. Switch S1 remains closed and the timing circuit is now in condition to begin a new timing cycle.

Attention is now directed toward the waveforms illustrated in FIGURE 3B, from which it will be observed that the voltage $V_C$ stored by timing capacitor 14 during a timing cycle of operation is a pulsating voltage, and after a timed interval $t_1$ the voltage will reach the peak point voltage $V_P$ at a time when the peak point voltage $V_P$ is decreasing in value and corresponding with firing point J, whereby the unijunction transistor 10 will become forward biased. Due to the characteristics of unijunction transistor 10, the timing capacitor 14 will not completely discharge to ground potential when transistor 10 becomes forward biased, but will be slightly charged with a voltage $V_T$, as illustrated in FIGURES 3B and 3C. The next succeeding timing cycle will begin with capacitor 14 previously charged to a level indicated by voltage $V_T$, and, accordingly, the stored voltage $V_C$ will attain a level equal to the peak voltage $V_P$ of transistor 10 in slightly less time than that required during the first cycle, as illustrated by the time interval $t_2$. The third time interval $t_3$ and all succeeding intervals will be substantially the same as the second interval $t_2$. The foregoing is true whether capacitor 14 be pulse charged, as illustrated in FIGURE 3B, or linearly charged, as illustrated in FIGURE 3C.

In accordance with one aspect of the present invention, a large capacitor 35, on the order of 50 microfarads with a 200 volt rating, shown in dotted lines in FIGURE 1, is connected between ground G and the cathode of isolation diode 17 to sufficiently filter the pulsating direct voltage $V_H$, prior to its application to timing capacitor 14, so that capacitor 14 is linearly charged, with the stored voltage $V_C'$ having a waveform as illustrated in FIGURE 3C. From FIGURE 3C it will be noted that the value of the stored voltage $V_C'$ almost attains the level of the peak point voltage $V_P$ of transistor 10 at firing point K, rather than at firing point L, as shown, for a timed interval $t_4$. If the supply voltage source C has a frequency of 60 cycles per second, then each cycle of peak point voltage $V_P$ will have a time period of 8 milliseconds (see FIGURE 3A). If the value of the stored voltage $V_C'$ does attain the level of the peak point voltage $V_P$ at firing point K instead of at firing point L, then the timed interval will be in error from the intended interval $t_4$ by a maximum period of 8 milliseconds, a timing accuracy of $\pm 4$ milliseconds. As the intended timed interval $t_4$ is increased say from .024 second, as shown in FIGURE 3C, to 2 minutes, the slope of the waveform of linearly stored voltage $V_C'$ will decrease, presenting a greater chance for timing error. If the RC time constant of the capacitor charging circuit is sufficiently great, the timing error might exceed the time period of a cycle of peak point voltage $V_P$, and thus be greater than 8 milliseconds.

In accordance with another and preferred aspect of the present invention, the capacitor 35 (and, if desired, isolation diode 17) is absent from the timing circuit so that the capacitor 14 is pulse or stepped charged, as illustrated in FIGURE 3B. As will be appreciated from the following description, greater timing accuracy for long timed intervals is obtained with the timing circuit minus capacitor 35. From FIGURE 3B it will be noted that the transistor 10 is forward biased, or "fired," at time corresponding with firing point J, almost one cycle earlier in the varying voltage $V_P$ than that if the capacitor 14 had been linearly charged and reached the peak point voltage $V_P$ at firing point L (see the waveform for stored voltage $V_C$ (ave.) in FIGURE 3B, corresponding with that for stored voltage $V_C'$ in FIGURE 3C).

By superimposing ripple voltage $V_R$ on the average voltage $Edc$, the reverse bias voltage $V_{B2}$, and, hence the peak point voltage $V_P$, will vary in accordance with the frequency of the ripple voltage $V_R$, the frequency of which is twice that of source C. The voltage stored by the timing capacitor 14 will be phase displaced and lead that of the peak point voltage $V_P$ (or reverse bias voltage $V_{B2}$). Thus, as illustrated in FIGURE 3B, the stored voltage $V_C$ of positive polarity will be increasing in magnitude at the same time that the reverse bias voltage $V_{B2}$, and, hence peak point voltage $V_P$, is decreasing in magnitude of positive polarity. Thus, the timing circuit will fire, i.e., transistor 10 will be forward biased, only when the slope of the waveform of peak point voltage $V_P$ is going negative (less positive) at both low and high supply frequencies. If, for example, the stored voltage $V_C$ is slightly less, say at point M in FIGURE 3B, than that required to forward bias transistor 10 for a given peak point voltage $V_P$, then by step charging capacitor 14 the stored voltage $V_C$ will be sufficient to forward bias the transistor during the next cycle of varying voltage $V_P$, or for a source frequency of 60 cycles per second no later than 8 milliseconds. Then, the transistor 10 must fire and the timing accuracy will be at least $\pm 4$ milliseconds. As the frequency of source C is increased to a high value, the accuracy of the timing circuit will be increased since the time period per cycle of voltage $V_P$ will be less. With a supply source frequency of 60 cycles per second, the possible firing points are spaced no further apart than 8 milliseconds in time, but for a supply frequency of 120 cycles per second the firing points will be spaced no further apart than 4 milliseconds in time, for a timing accuracy of ±2 milliseconds.

The operation of the timing circuit, according to the present invention, is always stabilized to twice the frequency of source C, whether capacitor 14 is linearly charged or pulse charged, until the voltage stored by the timing capacitor 14 approaches the peak point voltage $V_P$. At that time, if the capacitor is linearly charged the circuit will be somewhat free, depending on the time length of the timed interval, to fire at any one of several specific firing points which are each on a negative going slope of voltage $V_P$, i.e., firing points K, L, etc., which points are time spaced, for a 60 cycle per second source, by no more than 8 milliseconds. If, however, the capacitor 14 is pulse charged, the chances that the timer will fire at a given firing point are substantially increased since, as illustrated in FIGURE 3B, the stored voltage $V_C$ will increase in magnitude at a greater rate than if linearly charged, at the same time the peak point voltage $V_P$ is decreasing in magnitude.

In accordance with a preferred embodiment of the invention, the values and types of the various components illustrated in FIGURE 1 are as found in Table I.

TABLE I

| Component | Component value or type |
|---|---|
| Unijunction transistor **10** | 2N2646. |
| Timing capacitor **14** | 10 microfarads at 50 volts. |
| Timing resistor **16** | Calibrated at factory ½ watt. |
| Adjustable timing resistor **18** | 750 kilohms at ½ watt. |
| Bias resistor **20** | 150 kilohms at 2 watts. |
| Transient suppressor capacitor **22** | .022 microfarad at 100 volts. |
| Load resistor **24** | 150 ohms at ½ watt. |
| Rectifier diode **26** | IN3255. |
| Rectifier diode **28** | IN3255. |
| Rectifier diode **30** | IN3255. |
| Rectifier diode **32** | IN3255. |
| Isolation diode **34** | IN3255. |
| Filter capacitor **35** (for linear charging). | 50 microfarads at 200 volts. |
| Filter capacitor **36** | 2 microfarads at 600 volts. |
| Isolation resistor **38** | 10 ohms at ½ watt. |
| Isolation diode **40** | IN3255. |
| Silicon controlled rectifier **44** | C20B. |

The timing circuit of FIGURE 1 with the component types and values indicated in Table I, operated successfully with a timed interval range from 0.68 second to 1.10 seconds as adjusted by adjustable timing resistor 18, with a timing accuracy of ±4 milliseconds at supply frequency of 60 cycles per second.

We claim:

1. A method of operating a relaxation oscillator timing circuit which includes an electronic control device having a first, second, and control electrode; a capacitor coupled across said first and said control electrodes, said method including the steps of:

commencing the timing operation of each timing cycle by charging said capacitor with voltage so that the value of the voltage stored by said capacitor increases at a predetermined rate; and, applying, during each timing cycle, to said first and said second electrodes a cyclically varying reverse bias voltage of a given polarity, which voltage varies in magnitude in accordance with a given frequency so that when the value of the stored voltage attains a level equal to a characteristic voltage to terminate a timed interval of capacitor charging, the termination will occur at substantially the same point in time after commencement of each timing cycle of operation.

2. A method of operating a relaxation oscillator timing circuit which includes an electronic control device having a first, second, and control electrode; a reverse biasing circuit for applying reverse bias voltage to said first and said second electrodes of said device, a timing capacitor connected across said first and said control electrodes for storing voltage, said device being forward biased when the value of said stored voltage is equal to a characteristic voltage which is a function of said reverse bias voltage, said method comprising the steps of:

commencing each timing cycle of operation by applying a pulsating voltage of a given polarity and given frequency to said capacitor to pulse charge said capacitor at a rate equal to said given frequency; and, applying a cyclically varying reverse bias voltage of a particular polarity and of said given frequency to said first and said second electrodes so that when the value of the stored voltage attains a level equal to said characteristic voltage to terminate a timed interval of capacitor charging, the termination will occur at substantially the same point in time after commencement of each timing cycle of operation.

3. A method of operating a relaxation oscillator timing circuit which includes an electronic control device having a first, second, and control electrode; a reverse biasing circuit for applying reverse bias voltage to said first and said second electrodes of said device, a timing capacitor connected across said first and said control electrodes for storing a voltage, said device being forward biased when the value of said stored voltage is equal to a characteristic voltage which is a function of said reverse bias voltage, said method including the steps of:

developing a pulsating voltage of a given polarity and of a given pulsating frequency from a source of alternating current voltage having a fixed frequency;

developing a cyclically varying reverse bias voltage of said given polarity and of said given pulsating frequency from said source;

commencing each timing cycle of operation by applying said pulsating voltage to said capacitor to pulse charge said capacitor at a rate equal to said given frequency whereby the voltage across said capacitor will lead in phase that of said reverse bias voltage; and, applying said cyclically varying reverse bias voltage to said first and second electrodes so that when the value of the stored voltage attains a level equal to said characteristic voltage to terminate a timed interval of capacitor charging, the termination will occur at substantially the same point in time in a given cycle of said cyclically varying voltage after commencement of each timing cycle of operation when the magnitude of said pulsating voltage of said given polarity is increasing and the magnitude of said varying reverse bias voltage of said given polarity is decreasing.

4. In a relaxation oscillator timing circuit including an electronic control device having a first, second, and control electrode; a timing capacitor connected across said first and said control electrodes for storing voltage, said device being forward biased when the value of said stored voltage is equal to a characteristic voltage which is a function of a reverse bias voltage, the improvement in circuit means for stabilizing the time required during each timing cycle of operation to forward bias said device, and comprising:

means for connecting said capacitor to a source of voltage for charging said capacitor at a predetermined rate and thereby commencing a timing cycle of operation;

means for developing a cyclically varying reverse bias voltage of a given polarity from a source of voltage, said bias voltage varying in magnitude in accordance with a given frequency; and, means for applying said cyclically varying reverse bias voltage to said first and second electrodes so that when the value of the voltage stored by said capacitor attains a level equal to said characteristic voltage to terminate a timed interval of capacitor charging, the termination will occur at substantially the same point in time after commencement of each timing cycle of operation.

5. In a relaxation oscillator timing circuit including an electronic control device having a first, second, and control electrode; a timing capacitor connected across said first and said control electrodes for storing voltage, said device being forward biased when the value of said stored voltage is equal to a characteristic voltage which is a function of a reverse bias voltage, the improvement in circuit means for stabilizing the time required during each timing cycle of operation to forward bias said device, and comprising:

means for developing a pulsating voltage of a given polarity and of a given pulsating frequency from a source of voltage;

means for applying said pulsating voltage to said capacitor to pulse charge said capacitor at a rate equal to said given frequency, the commencement of a timing cycle of operation occurring upon application of said pulsating voltage to said capacitor;

means for developing a cyclically varying reverse bias voltage of a particular polarity from a source of voltage, said bias voltage varying in magnitude in accordance with said given frequency; and, means for applying said cyclically varying reverse bias voltage to said first and said second electrodes so that when the value of the voltage stored by said capacitor attains a level equal to said characteristic voltage to terminate a timed interval of capacitor charging, the termination will occur at substantially the same point in time after commencement of each timing cycle of operation.

6. In a relaxation oscillator timing circuit including an electronic control device having a first, second, and control electrode; a timing capacitor connected across said first and said control electrodes for storing voltage, said device being forward biased when the value of said stored voltage is equal to a characteristic voltage which is a function of a reverse bias voltage, the improvement in circuit means for stabilizing the time required during each timing cycle of operation to forward bias said device, and comprising:

means for developing a pulsating voltage of a given polarity and of a given pulsating frequency from an alternating current voltage source having a substantially fixed frequency;

means for applying said pulsating voltage to said capacitor to pulse charge said capacitor at a rate equal to said given frequency whereby the voltage stored by said capacitor will lead in phase that of said source, the commencement of a timing cycle of operation occurring upon application of said pulsating voltage to said capacitor;

means for developing a cyclically varying reverse bias voltage of said given polarity and of said given frequency from said alternating current voltage source; and, means for applying said cyclically varying reverse bias voltage to said first and said second electrodes so that when the value of the voltage stored by said capacitor attains a level equal to said characteristic voltage to terminate a timed interval of capacitor charging, the termination will occur at substantially the same point in time of a given cycle of said cyclically varying voltage after commencement of each timing cycle of operation when the pulsating voltage of said given polarity across said capacitor is increasing in magnitude and said cyclically reverse bias voltage of said given polarity is decreasing in magnitude.

7. In a relaxation oscillator timing circuit including a unijunction transistor having a first base, a second base, and an emitter, a timing capacitor for storing voltage connected between said emitter and one of said bases, a capacitor charging circuit for said capacitor including a timing resistor in series with said capacitor, said transistor being forward biased when the value of said stored voltage is equal to the peak point voltage of said transistor, the improvement in circuit means for stabilizing the time required during each timing cycle of operation to forward bias said device, comprising:

a full wave rectifier having an input circuit adapted to be connected to a line frequency alternating current voltage source and an output circuit for providing a full wave partially rectified signal voltage;

a filter capacitor connected in parallel with the output circuit of said rectifier for partially filtering said rectified signal voltage to develop a reverse bias voltage including a ripple voltage component of a frequency twice that of said line frequency; and, circuit means connecting said filter capacitor across said first and second bases of said unijunction transistor so that the reverse bias potential on the second base varies in amplitude in accordance with said ripple voltage component and at a frequency twice that of line frequency.

8. In a timing circuit as set forth in claim 7, including circuit means connecting the output circuit of said full wave rectifier with said timing capacitor for pulse charging said capacitor at a rate equal to twice the line frequency.

9. In a timing circuit as set forth in claim 7, including a unijunction transistor disabling circuit connected in parallel with said timing capacitor, said disabling circuit including a switching means having a first condition for deactivating said disabling circuit and a second condition for activating said disabling circuit so that said timing capacitor will not receive a charging voltage.

10. In a timing circuit as set forth in claim 7 wherein said ripple voltage component is at least 5 percent of said rectified signal voltage.

References Cited

UNITED STATES PATENTS

| | | | |
|---|---|---|---|
| 3,255,384 | 6/1966 | Riebs | 307—252 |
| 3,333,175 | 7/1967 | Klyce | 307—252 |

ARTHUR GAUSS, Primary Examiner

S. T. KRAWCZEWICZ, Assistant Examiner

U.S. Cl. X.R.

307—252, 271